United States Patent
Kim

(10) Patent No.: US 11,683,665 B2
(45) Date of Patent: Jun. 20, 2023

(54) METHOD AND APPARATUS FOR HANDLING OF A DATA INACTIVITY TIMER FOR MBS SESSION IN A WIRELESS COMMUNICATION SYSTEM

(71) Applicant: LG ELECTRONICS INC., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/981,061

(22) Filed: Nov. 4, 2022

(65) Prior Publication Data

US 2023/0068311 A1    Mar. 2, 2023

Related U.S. Application Data

(63) Continuation of application No. PCT/KR2021/017216, filed on Nov. 23, 2021.

(51) Int. Cl.
| | |
|---|---|
| H04W 4/06 | (2009.01) |
| H04W 76/27 | (2018.01) |
| H04W 76/40 | (2018.01) |

(52) U.S. Cl.
CPC ............ *H04W 4/06* (2013.01); *H04W 76/27* (2018.02); *H04W 76/40* (2018.02)

(58) Field of Classification Search
CPC ....... H04W 4/06; H04W 76/27; H04W 76/40; Y02D 30/70
See application file for complete search history.

(56) References Cited

U.S. PATENT DOCUMENTS

| | | | |
|---|---|---|---|
| 11,589,416 B2* | 2/2023 | Park | H04W 76/30 |
| 2013/0294307 A1 | 11/2013 | Johansson et al. | |
| 2017/0064534 A1* | 3/2017 | Loehr | H04W 72/21 |
| 2019/0166646 A1 | 5/2019 | Shih et al. | |
| 2020/0059991 A1* | 2/2020 | Wu | H04W 76/27 |
| 2020/0314947 A1* | 10/2020 | Latheef | H04W 76/38 |
| 2021/0337625 A1* | 10/2021 | Tsai | H04W 74/0833 |
| 2021/0409984 A1* | 12/2021 | Agiwal | H04W 76/23 |
| 2022/0295590 A1* | 9/2022 | Yang | H04W 76/25 |

OTHER PUBLICATIONS

R2-2008929, 3GPP TSG RAN WG2 Meeting #112-e, Electronic meeting, Nov. 2-Nov. 13, 2020, Agenda item: 8.1.1, Source: Chengdu TD Tech, Title: Discussion on the protocol stack for NR MGS, Document for: Discussion and Decision, (6 pages).

(Continued)

*Primary Examiner* — Will W Lin
(74) *Attorney, Agent, or Firm* — Dentons US LLP

(57) ABSTRACT

A method and apparatus for handling of a data inactivity timer for MBS session in a wireless communication system is provided. A wireless device may receive, from a network, a configuration of a data inactivity timer. A wireless device may receive a Medium Access Control Service Data Unit (MAC SDU) for a Multicast Traffic Channel (MTCH) for a MBS session. A wireless device may start or restart the data inactivity timer based on determining that the MBS session cannot be received in RRC_IDLE through the MTCH.

20 Claims, 17 Drawing Sheets

(56) References Cited

OTHER PUBLICATIONS

R3-206915, 3GPP TSG-RAN WG3 Meeting #110-e, Online, Nov. 2-12, 2020, Title: Summary of offline discussion for CB: #66_MBS_AOB, Source: CATT, Agenda item: 22.4, Document for: Discussion and Decision, (13 pages).

3GPP TR 23.757 V1.2.0 (Nov. 2020), Release 17, Technical Report, 3rd Generation Partnership Project; Technical Specification Group Services and System Aspects; Study on architectural enhancements for 5G multicast-broadcast services (Release 17) (293 pages).

3GPP TS 36.300 V16.3.0 (Sep. 2020), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 16) (390 pages).

3GPP TS 38.331 V16.2.0 (Sep. 2020), Technical Specification, 3rd Generation Partnership Project; Technical Specification Group Radio Access Network; NR; Radio Resource Control (RRC) protocol specification, (Release 16) (921 pages).

\* cited by examiner

METHOD AND APPARATUS FOR HANDLING OF A DATA INACTIVITY TIMER FOR MBS SESSION IN A WIRELESS COMMUNICATION SYSTEM

This application is a Continuation Bypass of International Application No. PCT/KR2021/017216, filed on Nov. 23, 2021, which claims priority of Korean Application No. 10-2020-0164422, filed on Nov. 30, 2020, the contents of which are all hereby incorporated by reference herein in their entirety.

TECHNICAL FIELD

The present disclosure relates to a method and apparatus for handling of a data inactivity timer for MBS session in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

If any Medium Access Control (MAC) entity receives a MAC service data unit (SDU) for Dedicated Traffic Channel (DTCH) logical channel, Dedicated Control Channel (DCCH) logical channel, or Common Control Channel (CCCH) logical channel, the MAC entity may start or restart the data inactivity timer.

If the data inactivity timer expires, the MAC may indicate the expiry of the data inactivity timer to RRC layers. Upon receiving the expiry of data inactivity timer from MAC layer while in RRC_CONNECTED, the UE may go to RRC_IDLE state.

Logical channels for a multicast/broadcast session (for example, MTCH) can be divided into two types, (1) a logical channel a multicast/broadcast session that can be received in RRC_IDLE and (2) a logical channel a multicast/broadcast session that cannot be received in RRC_IDLE. Thus, different handling may be required for the data inactivity timer based on the type of the logical channel for multicast/broadcast session when UE receives MAC SDU for the logical channel for multicast/broadcast session.

Therefore, studies for handling of a data inactivity timer for MBS session in a wireless communication system are required.

In an aspect, a method performed by a wireless device in a wireless communication system is provided. A wireless device may receive, from a network, a configuration of a data inactivity timer. A wireless device may receive a Medium Access Control Service Data Unit (MAC SDU) for a Multicast Traffic Channel (MTCH) for a MBS session. A wireless device may start or restart the data inactivity timer based on determining that the MBS session cannot be received in RRC_IDLE through the MTCH.

In another aspect, an apparatus for implementing the above method is provided.

The present disclosure can have various advantageous effects.

According to some embodiments of the present disclosure, a wireless device could handle a data inactivity timer for MBS session efficiently.

For example, if a wireless device is receiving a MBS session (that is, a multicast session or a broadcast session) in RRC_CONNECTED and the MBS session cannot be received in RRC_IDLE, the wireless device could keep receiving the MBS session in RRC_CONNECTED by restarting the data inactivity timer upon receiving the MBS session.

For other example, if a wireless device is receiving a multicast/broadcast session in RRC_CONNECTED and the multicast/broadcast session can be received in RRC_IDLE, the wireless device could save power by going to RRC_IDLE when the inactivity timer expires.

According to some embodiments of the present disclosure, a wireless communication system could efficiently provide a MBS session to a wireless device in RRC_CONNECTED or RRC_IDLE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
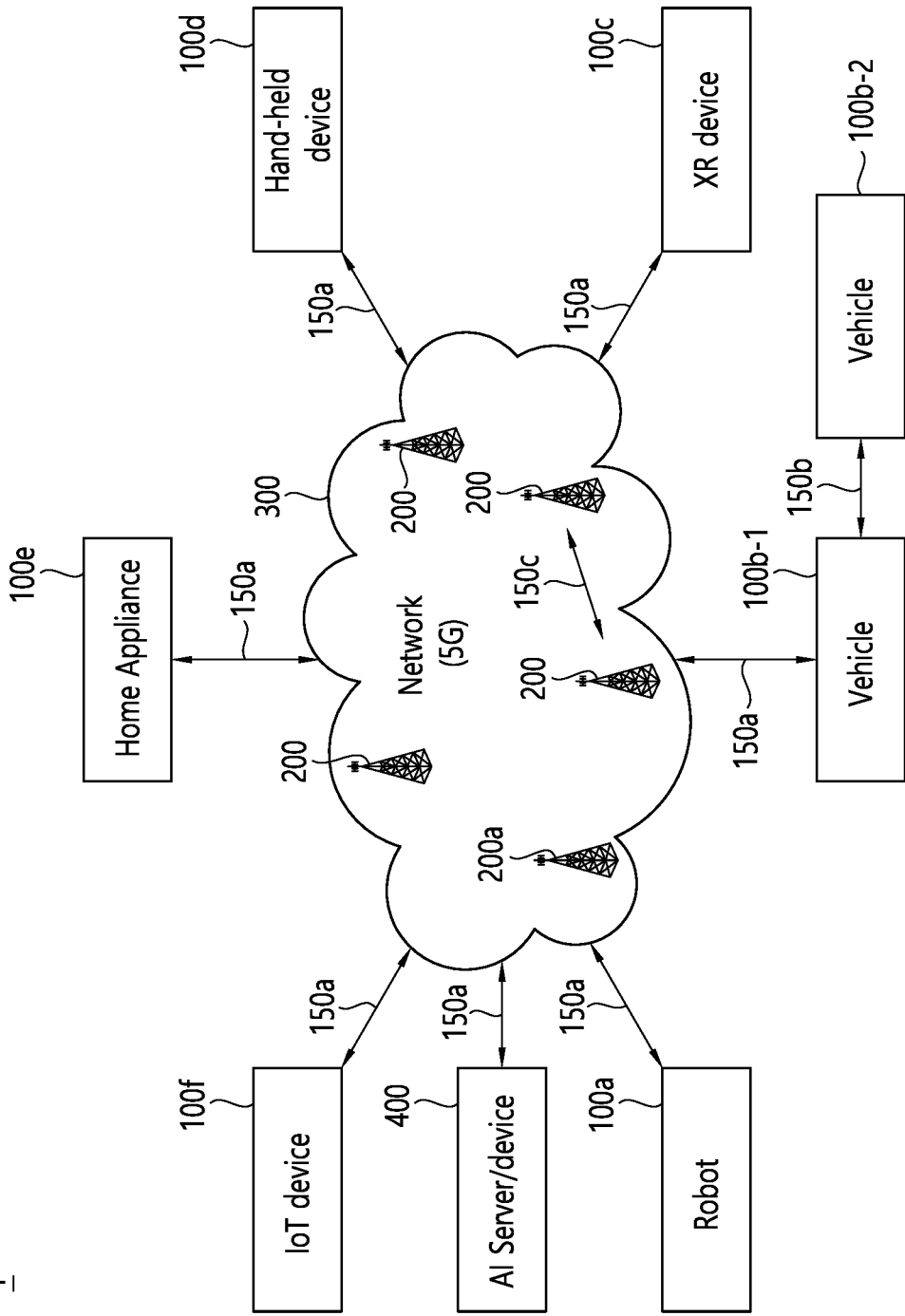
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud.

When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility.

This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a SG network as an example of the network of the communication system 1, the implementations of the present disclosure are not limited to the SG system, and can be applied to the future communication system beyond the SG system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
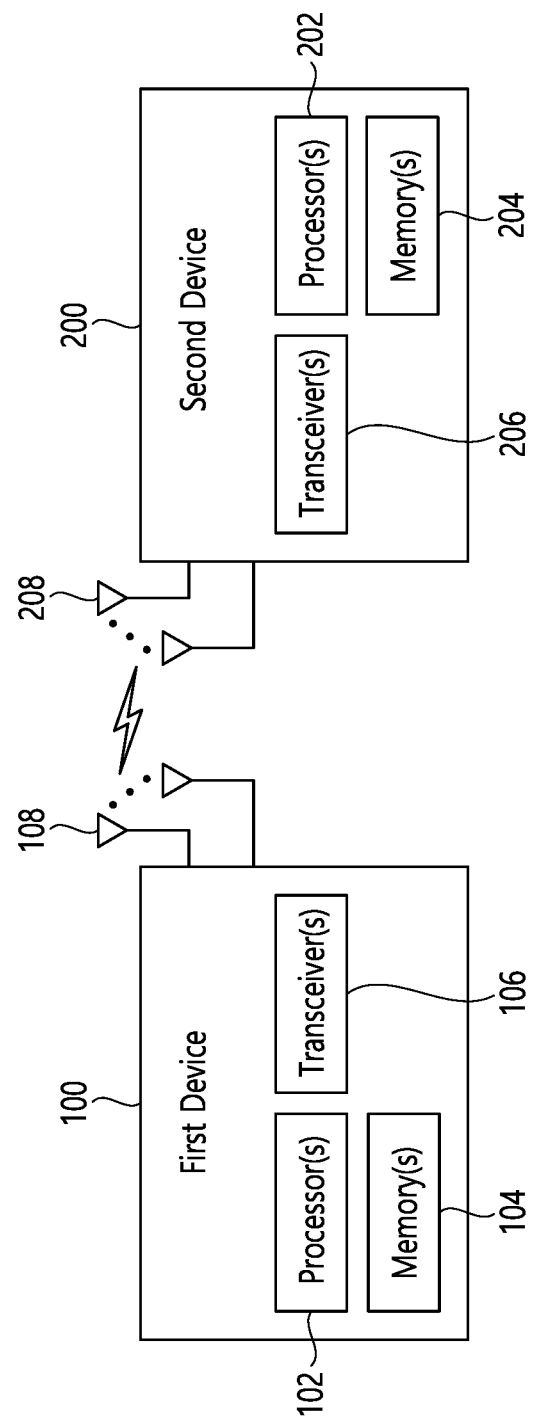
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands The one or more memories 104 and 204 may be connected to the one or more processors 102 and 202 and store various types of data, signals, messages, information, programs, code, instructions, and/or commands The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert 01-DM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
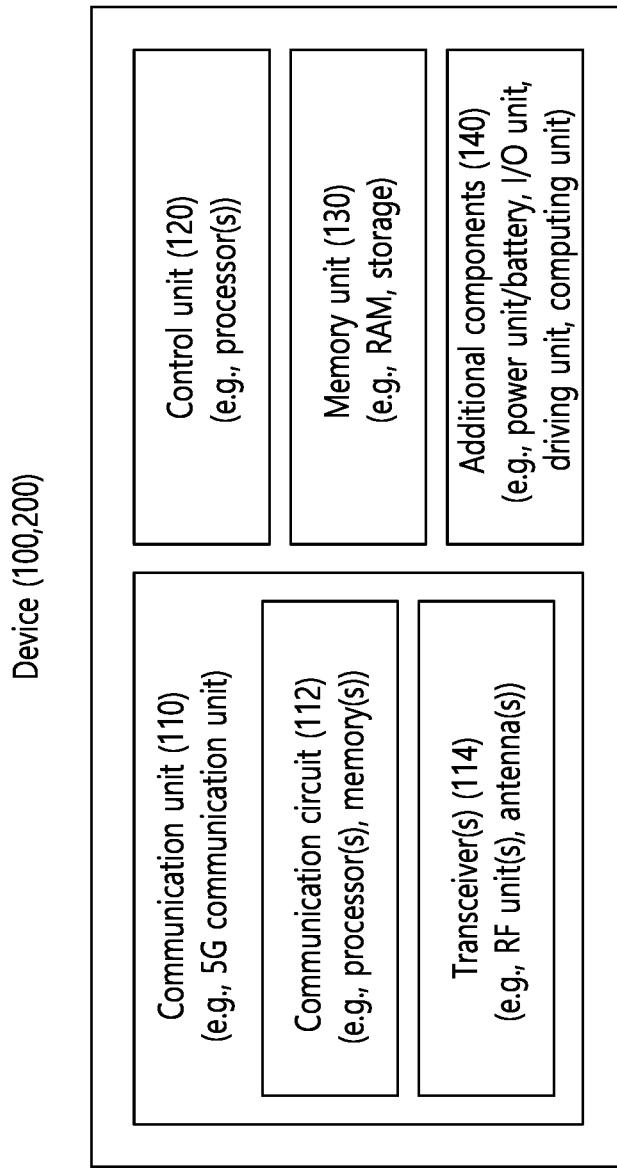
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
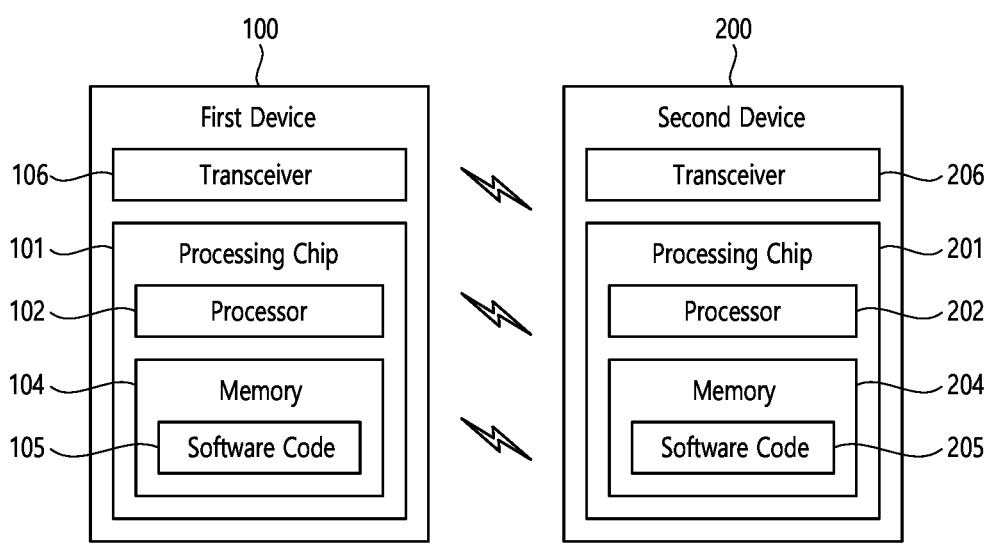
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
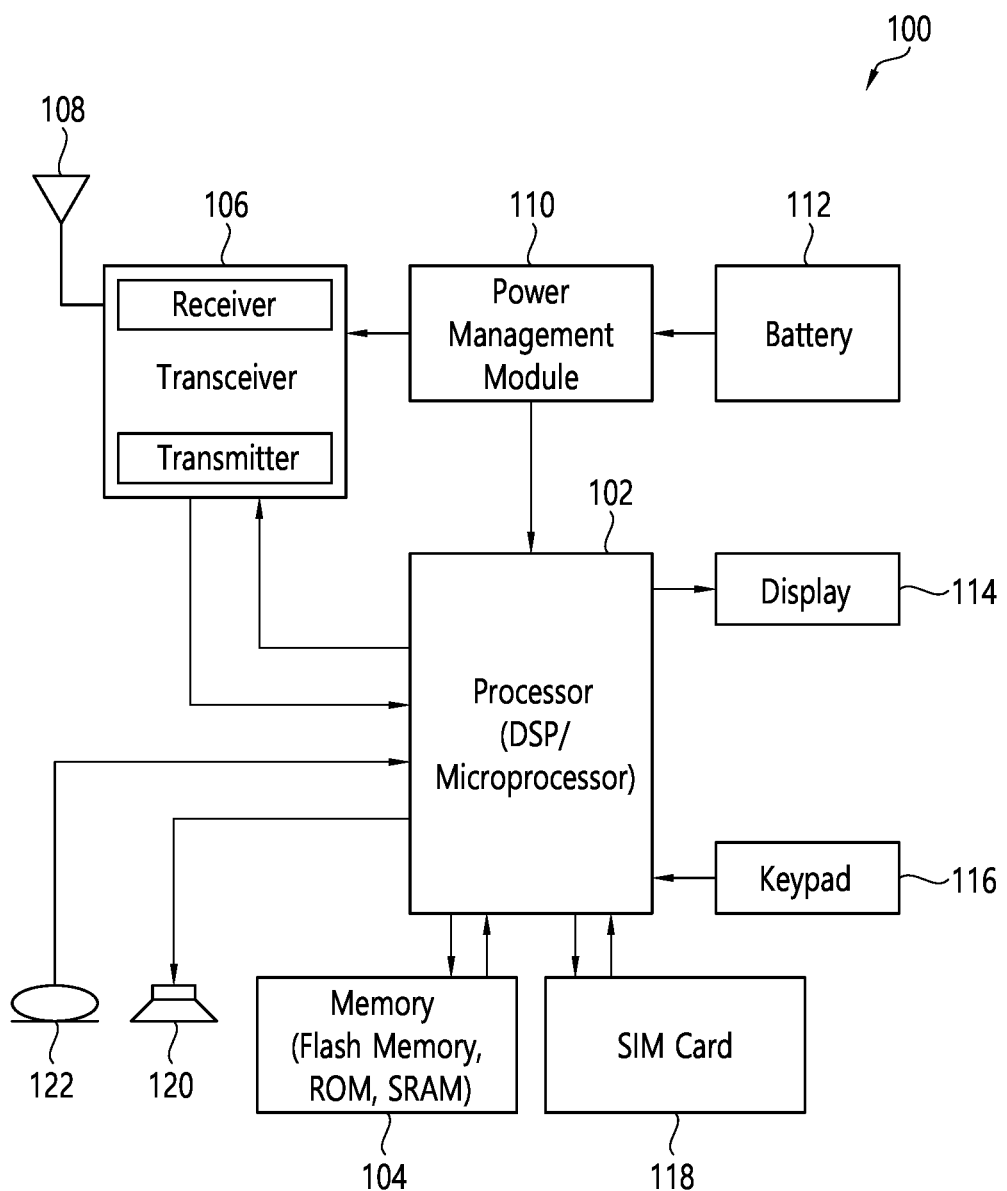
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
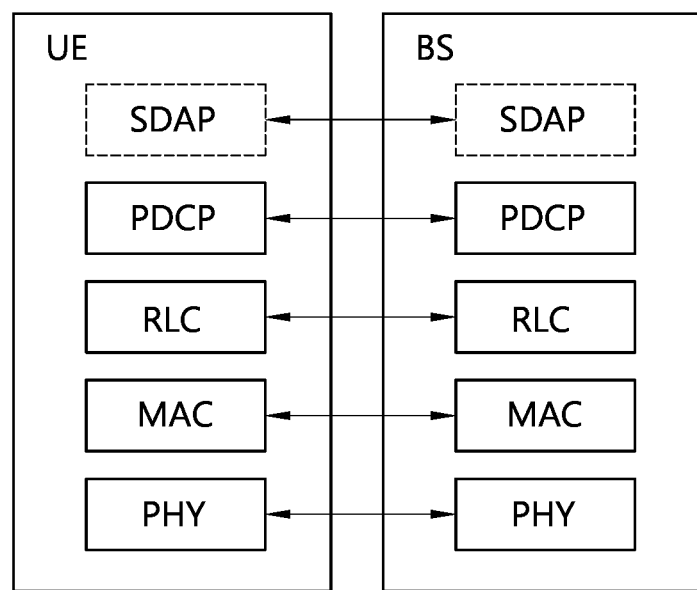
FIGS. 6 and 7 show an example of protocol stacks in a 3GPP based wireless communication system to which implementations of the present disclosure is applied.
Figure 7:
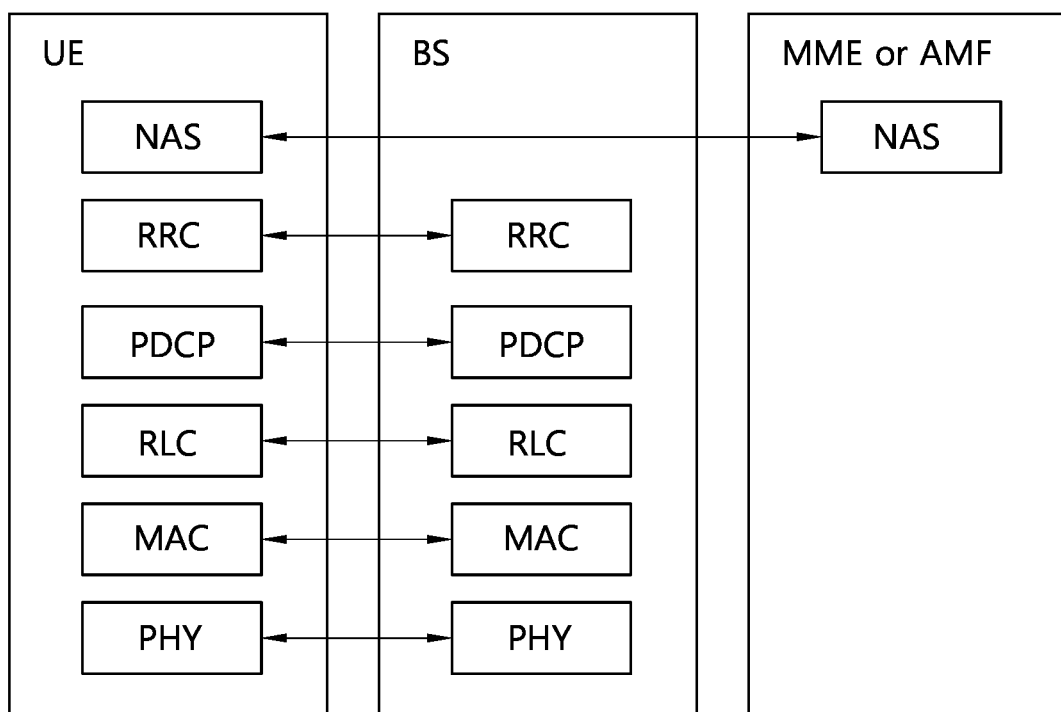

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
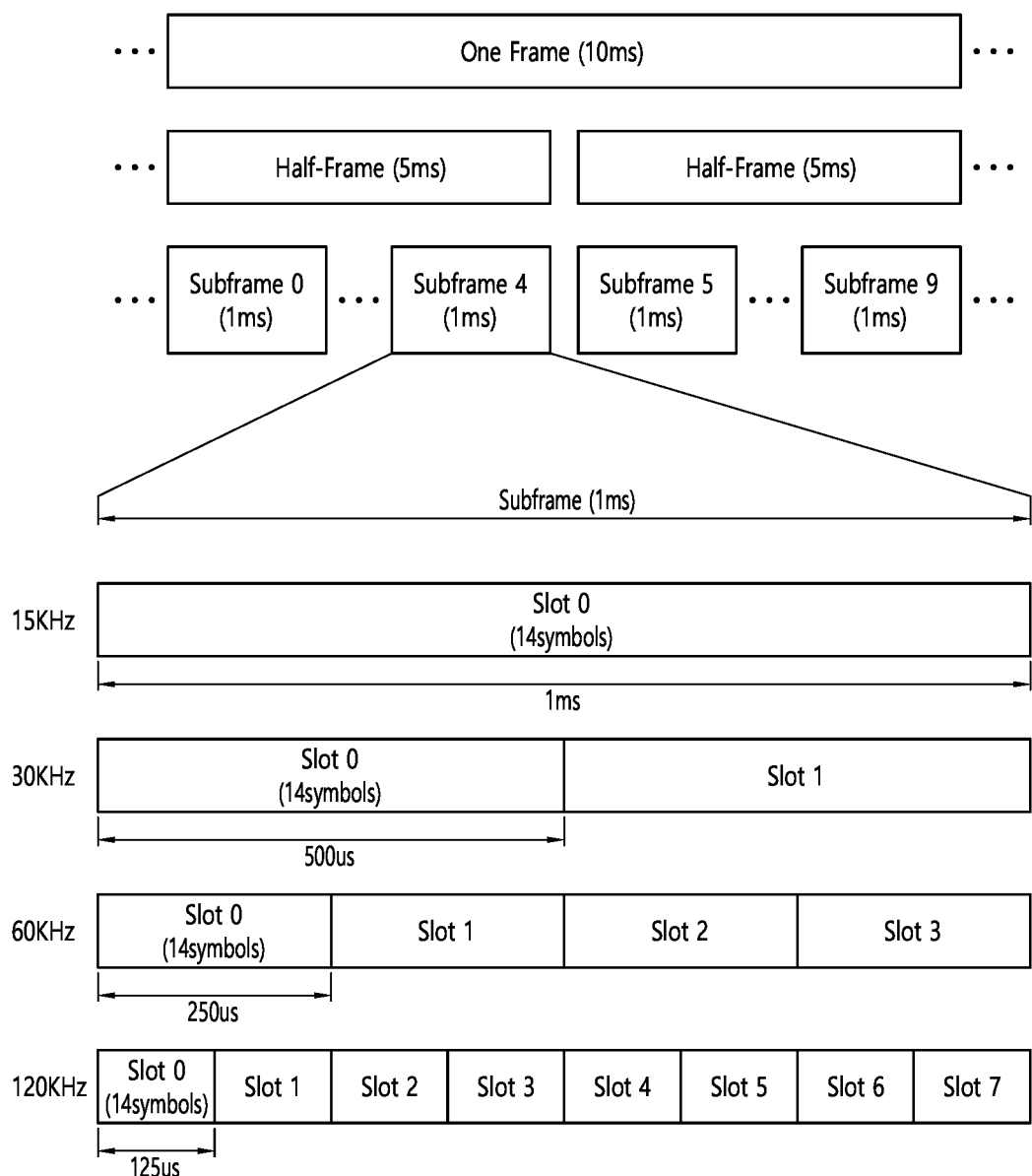
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f = 10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame, u}_{slot}$, and the number of slots per subframe $N^{subframe, u}_{slot}$ for the normal CP, according to the subcarrier spacing $\Delta f = 2^u * 15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |

TABLE 1-continued

| u | $N^{slot}_{symb}$ | $N^{frame, u}_{slot}$ | $N^{subframe, u}_{slot}$ |
|---|---|---|---|
| 3 | 14 | 80 | 8 |
| 4 | 14 | 160 | 16 |

Table 2 shows the number of OFDM symbols per slot $N^{slot}_{symb}$, the number of slots per frame $N^{frame, u}_{slot}$, and the number of slots per subframe $N^{subframe, u}_{slot}$ for the normal CP, according to the subcarrier spacing $\Delta f = 2^u * 15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size, u}_{grid, x} * N^{RB}_{sc}$ subcarriers and $N^{subframe, u}_{symb}$ OFDM symbols is defined, starting at common resource block (CRB) $N^{start, u}_{grid}$ indicated by higher-layer signaling (e.g., RRC signaling), where $N^{size, u}_{grid, x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p subcarrier spacing configuration u, and transmission direction (DL or UL). The carrier bandwidth $N^{size, u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP, i} - 1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP, i}$, where $N^{size}_{BWP, i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., 1-R1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
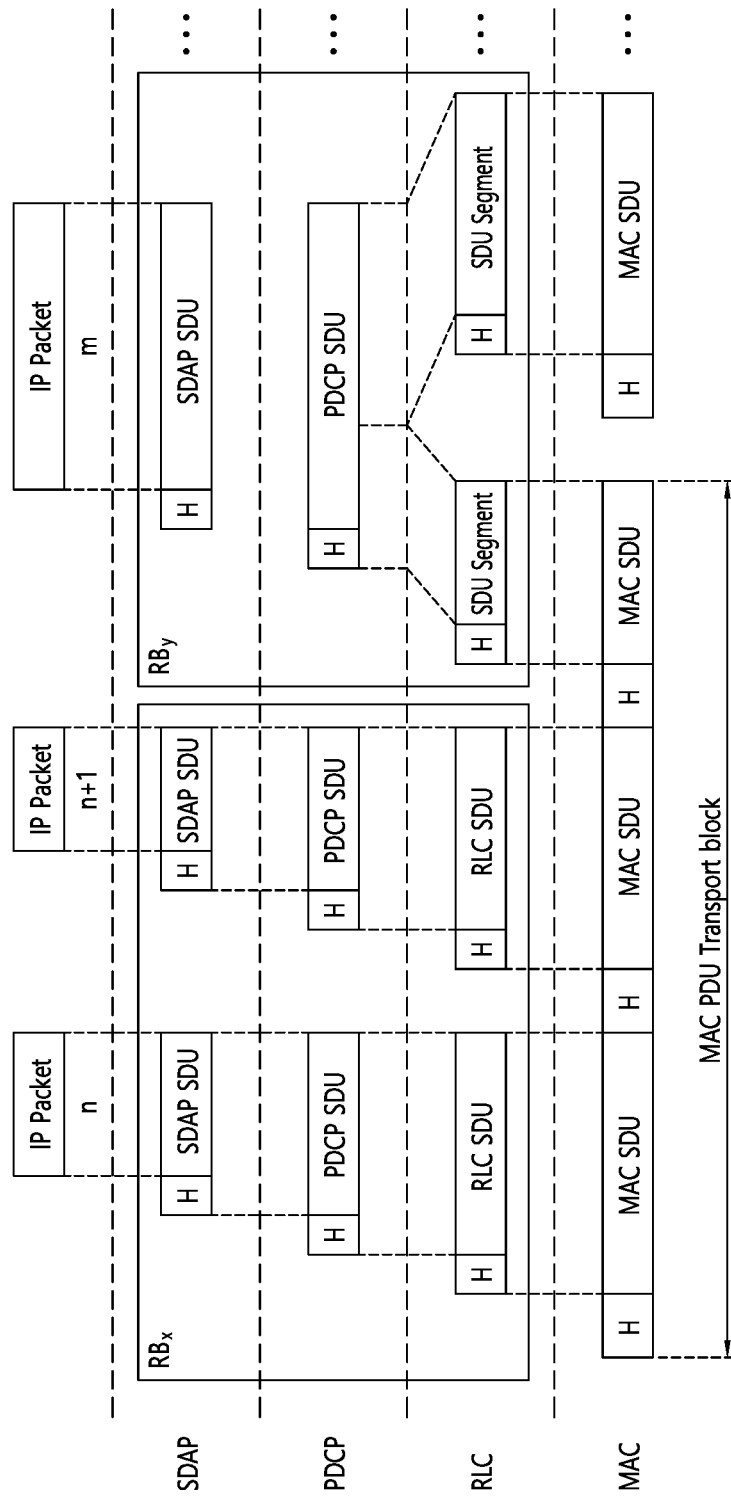
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, UE actions upon the expiry of DataInactivityTimer is described. Section 5.3 of 3GPP TS 38.331 v16.2.0 may be referred.

Upon receiving the expiry of DataInactivityTimer from lower layers while in RRC_CONNECTED, the UE shall:
1> perform the actions upon going to RRC_IDLE as below, with release cause 'RRC connection failure'.
The UE actions upon going to RRC_IDLE is described.
The UE shall:
1> reset MAC;
1> set the variable pendingRNA-Update to false, if that is set to true;
1> if going to RRC_IDLE was triggered by reception of the RRCRelease message including a waitTime:
2> if T302 is running
3> stop timer T302;
2> start timer T302 with the value set to the waitTime;
2> inform upper layers that access barring is applicable for all access categories except categories '0' and '2'.
1> else:
2> if T302 is running
3> stop timer T302;
3> perform the actions related to the expiry of T302;

1> if T390 is running
2> stop timer T390 for all access categories;
2> perform the actions related to the expiry of T390;
1> if the UE is leaving RRC_INACTIVE:
2> if going to RRC_IDLE was not triggered by reception of the RRCRelease message:
3> if stored, discard the cell reselection priority information provided by the cellReselectionPriorities;
3> stop the timer T320, if running;
1> stop all timers that are running except T302, T320, T325, T330, T331 and T400;
1> discard the UE Inactive AS context, if any;
1> release the suspendConfig, if configured;
1> remove all the entries within VarConditionalReconfig, if any;
1> for each measId, if the associated reportConfig has a reportType set to condTriggerConfig:
2> for the associated reportConfigId:
3> remove the entry with the matching reportConfigId from the reportConfigList within the VarMeasConfig;
2> if the associated measObjectId is only associated to a reportConfig with reportType set to condTriggerConfig:
3> remove the entry with the matching measObjectId from the measObjectList within the VarMeasConfig;
2> remove the entry with the matching measId from the measIdList within the VarMeasConfig;
1> discard the $K_{gNB}$ key, the S-$K_{gNB}$ key, the S-$K_{eNB}$ key, the $K_{RRCenc}$ key, the $K_{RRCint}$ key, the $K_{UPint}$ key and the $K_{UPenc}$ key, if any;
1> release all radio resources, including release of the RLC entity, the BAP entity, the MAC configuration and the associated PDCP entity and SDAP for all established RBs;
1>indicate the release of the RRC connection to upper layers together with the release cause;
1>except if going to RRC_IDLE was triggered by inter-RAT cell reselection while the UE is in RRC_INACTIVE or RRC_IDLE or when selecting an inter-RAT cell while T311 was running or when selecting an E-UTRA cell for EPS fallback for IMS voice:
2>enter RRC_IDLE and perform cell selection;
Hereinafter, MAC-CellGroupConfig is described.

The IE MAC-CellGroupConfig may be used to configure MAC parameters for a cell group, including DRX.

The MAC-CellGroupConfig field descriptions may include the IE dataInactivityTimer.

The IE dataInactivityTimer may means that releasing the RRC connection upon data inactivity.

For example, DataInactivityTimer may include an ENUMERATED data, for example, {s1, s2, s3, s5, s7, s10, s15, s20, s40, s50, s60, s80, s100, s120, s150, s180}. Value s1 may correspond to 1 second, value s2 may correspond to 2 seconds, and so on.

Hereinafter, technical features related to MBMS is described. Section 15 of 3GPP TS 36.300 v16.3.0 may be referred.

Figure 10:
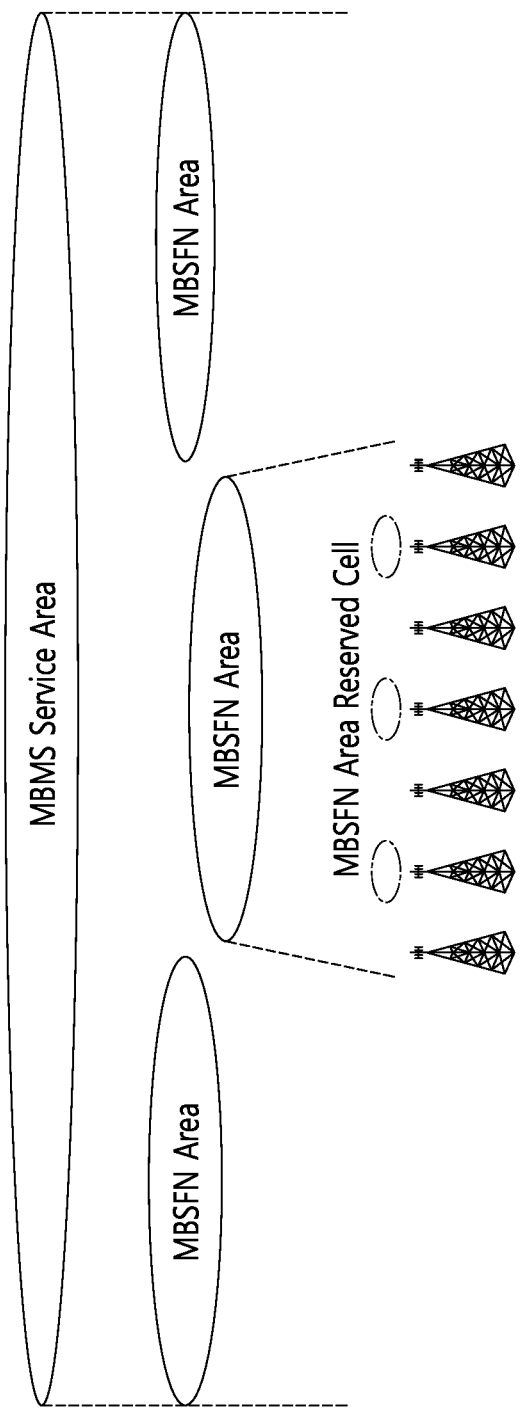
FIG. 10 shows MBMS definitions to which implementations of the present disclosure is applied.

FIG. 10 shows MBMS definitions to which implementations of the present disclosure is applied.

MBSFN Synchronization Area: an area of the network where all eNodeBs can be synchronized and perform MBSFN transmissions. MBSFN Synchronization Areas are capable of supporting one or more MBSFN Areas. On a given frequency layer, an eNodeB can only belong to one MBSFN Synchronization Area. MBSFN Synchronization Areas are independent from the definition of MBMS Service Areas MBSFN Transmission or a transmission in MBSFN mode: a simulcast transmission technique realised by transmission of identical waveforms at the same time from multiple cells. An MBSFN Transmission from multiple cells within the MBSFN Area is seen as a single transmission by a UE.

MBSFN Area: an MBSFN Area consists of a group of cells within an MBSFN Synchronization Area of a network, which are co-ordinated to achieve an MBSFN Transmission. Except for the MBSFN Area Reserved Cells, all cells within an MBSFN Area contribute to the MBSFN Transmission and advertise its availability. The UE may only need to consider a subset of the MBSFN areas that are configured, i.e. when it knows which MBSFN area applies for the service(s) it is interested to receive.

MBSFN Area Reserved Cell: A cell within a MBSFN Area which does not contribute to the MBSFN Transmission. The cell may be allowed to transmit for other services but at restricted power on the resource allocated for the MBSFN transmission.

Synchronisation Sequence: Each SYNC PDU contains a time stamp which indicates the start time of the synchronisation sequence. For an MBMS service, each synchronisation sequence has the same duration which is configured in the BM-SC and the MCE.

Synchronisation Period: The synchronisation period provides the time reference for the indication of the start time of each synchronisation sequence. The time stamp which is provided in each SYNC PDU is a relative value which refers to the start time of the synchronisation period. The duration of the synchronisation period is configurable.

In E-UTRAN, MBMS can be provided with single frequency network mode of operation (MBSFN) either on a frequency layer shared with non-MBMS services (set of cells supporting both unicast and MBMS transmissions i.e. set of "MBMS/Unicast-mixed cells") or on a frequency layer dedicated for MBMS (set of cells supporting MBMS transmission only i.e. set of "MBMS-dedicated cells").

MBMS reception is possible for UEs in RRC_IDLE state, or except for NB-IoT UEs, BL UEs or UEs in enhanced coverage, in RRC_CONNECTED state. Whenever receiving MBMS services, a user shall be notified of an incoming call, and originating calls shall be possible.

ROHC for MBMS is supported by upper layers (outside of Access Stratum) and only for Mission Critical services.
RNs do not support MBMS.
HeNBs do not support MBMS.
For NB-IoT UEs, BL UEs or UEs in enhanced coverage:
MBMS is provided in "MBMS/Unicast-mixed cells" with single-cell transmission.
MBMS reception is possible only for UEs in RRC_IDLE state.
Whenever receiving MBMS services, a user shall be notified of an incoming call, and originating calls shall be possible:
Mobile Terminated call has higher priority than MBMS reception;
Mobile Originated signalling has higher priority than MBMS reception;
Other cases are left to UE implementation.

Figure 11:
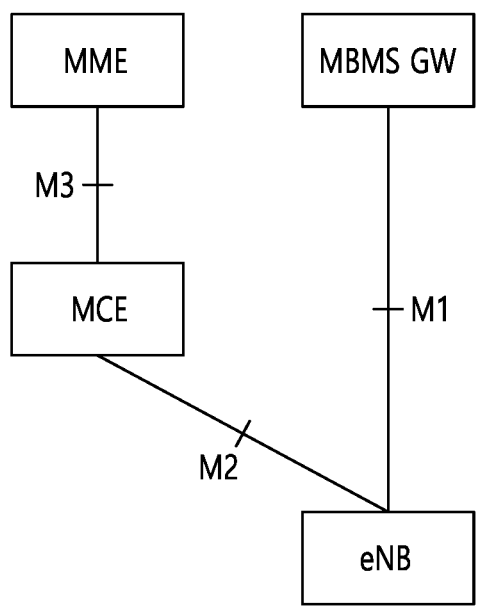
FIG. 11 shows E-MBMS logical Architecture to which implementations of the present disclosure is applied.

FIG. 11 shows E-MBMS logical Architecture to which implementations of the present disclosure is applied.

E-MBMS logical Architecture may include MBMS Gateway (MBMS GW), Multi-Cell/Multicast Coordination Entity (MCE), user plane interface (M1), E-UTRAN internal control plane interface (M2), and control plane interface between E-UTRAN and EPC (M3).

Technical features related to Multi-cell/multicast Coordination Entity (MCE) are described.

The MCE is a logical entity—this does not preclude the possibility that it may be part of another network element—whose functions are:

the admission control and the allocation of the radio resources used by all eNBs in the MBSFN area for multi-cell MBMS transmissions using MBSFN operation. The MCE decides not to establish the radio bearer(s) of the new MBMS service(s) if the radio resources are not sufficient for the corresponding MBMS service(s) or may pre-empt radio resources from other radio bearer(s) of ongoing MBMS service(s) according to ARP. Besides allocation of the time/frequency radio resources this also includes deciding the further details of the radio configuration e.g. the modulation and coding scheme.

deciding on whether to use SC-PTM or MBSFN.

counting and acquisition of counting results for MBMS service(s).

resumption of MBMS session(s) within MBSFN area(s) based on e.g. the ARP and/or the counting results for the corresponding MBMS service(s).

suspension of MBMS session(s) within MBSFN area(s) based e.g. the ARP and/or on the counting results for the corresponding MBMS service(s).

In case of distributed MCE architecture, the MCE manages the above functions for a single eNB of a MBSFN. The coordination of the functions between MCEs is provided by OAM, if needed.

The MCE is involved in MBMS Session Control Signalling. The MCE does not perform UE-MCE signalling.

An eNB is served by a single MCE.

Technical features related to E-MBMS Gateway (MBMS GW) are described.

The MBMS GW is a logical entity—this does not preclude the possibility that it may be part of another network element—that is present between the BMSC and eNBs whose principal functions is the sending/broadcasting of MBMS packets to each eNB transmitting the service. The MBMS GW uses IP Multicast as the means of forwarding MBMS user data to the eNB. The MBMS GW performs MBMS Session Control Signalling (Session start/update/stop) towards the E-UTRAN via MME.

Technical features related to Control Plane Interfaces are described.

"M3" Interface: MCE—MME

An Application Part is defined for this interface between MME and MCE. This application part allows for MBMS Session Control Signalling on E-RAB level (i.e. does not convey radio configuration data). The procedures comprise e.g. MBMS Session Start and Stop. SCTP is used as signalling transport i.e. Point-to-Point signalling is applied.

"M2" Interface: MCE—eNB

An Application Part is defined for this interface, which conveys at least radio configuration data for the multi-cell transmission mode eNBs and Session Control Signalling. SCTP is used as signalling transport i.e. Point-to-Point signalling is applied.

User Plane Interface

"M1" Interface: MBMS GW—eNB

This interface is a pure user plane interface. Consequently no Control Plane Application Part is defined for this interface. IP Multicast is used for point-to-multipoint delivery of user packets.

Figure 12:
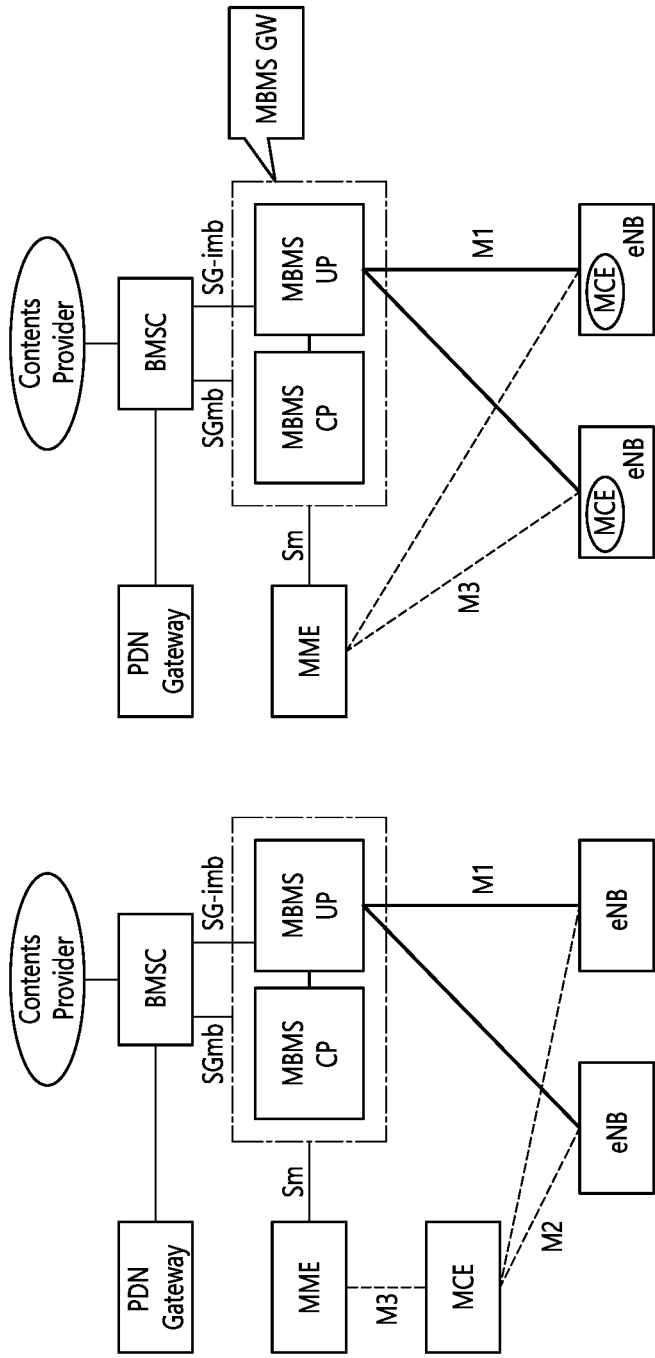
FIG. 12 shows eMBMS Architecture deployment alternatives to which implementations of the present disclosure is applied.

FIG. 12 shows eMBMS Architecture deployment alternatives to which implementations of the present disclosure is applied.

For example, the two envisaged alternatives are shown in FIG. 12.

The architecture on the right part is defined as the "distributed MCE architecture". In this architecture, a MCE is part of the eNB and the M2 interface should be kept between the MCE and the corresponding eNB.

The architecture on the left part is defined as the "centralized MCE architecture". In this architecture, the MCE is a logical entity which means it can be deployed as a stand-alone physical entity or collocated in another physical entity e.g. eNB. In both cases of the centralized MCE architecture, the M2 interface is kept between the MCE and all eNB(s) belonging to the corresponding MBSFN area.

When MBMS is used to deliver downlink V2X messages, the localized MBMS may be used to improve latency if desired.

Single TMGI in non-overlapped MBMS service areas or multiple TMGIs in overlapped MBMS service areas may be used to support small MBMS areas for V2X.

Figure 13:
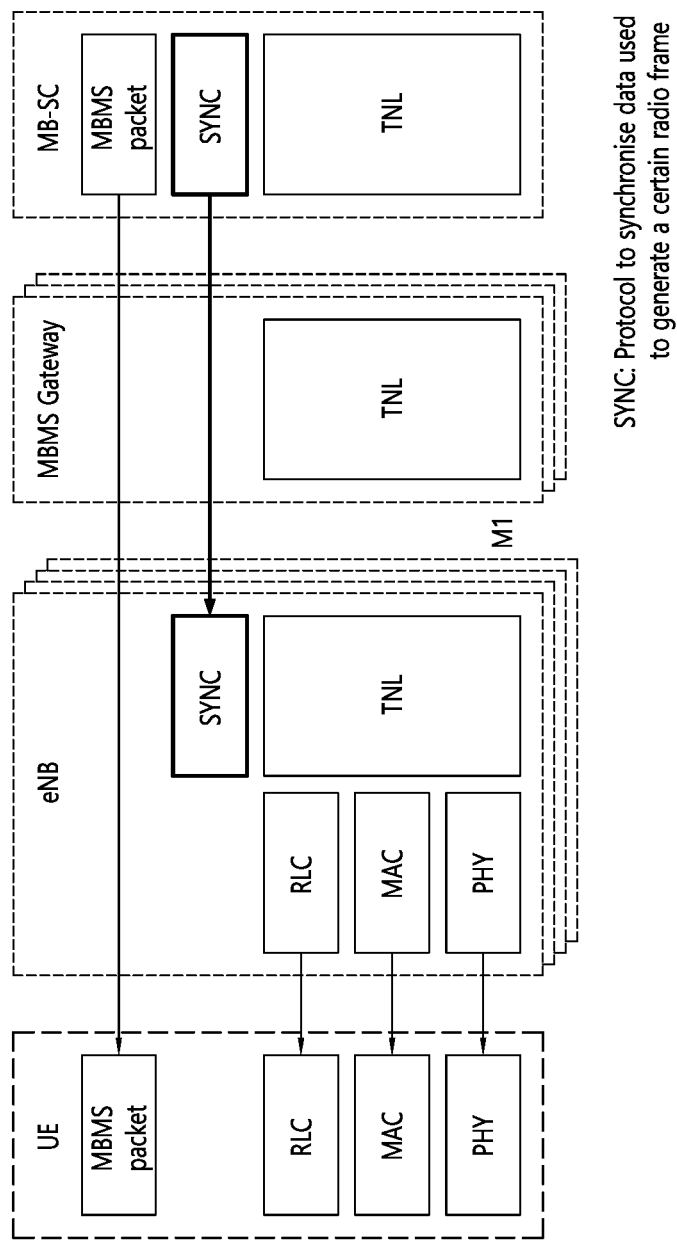
FIG. 13 shows the overall u-plane architecture of the MBMS content synchronization to which implementations of the present disclosure is applied.

FIG. 13 shows the overall u-plane architecture of the MBMS content synchronization to which implementations of the present disclosure is applied.

This architecture is based on the functional allocation for Unicast and the SYNC protocol layer is defined additionally on transport network layer to support content synchronization mechanism.

The SYNC protocol is defined as a protocol to carry additional information that enable eNBs to identify the timing for radio frame transmission and detect packet loss. Every E-MBMS service uses its own SYNC entity. The SYNC protocol is applicable to DL and is terminated in the BM-SC.

Figure 14:
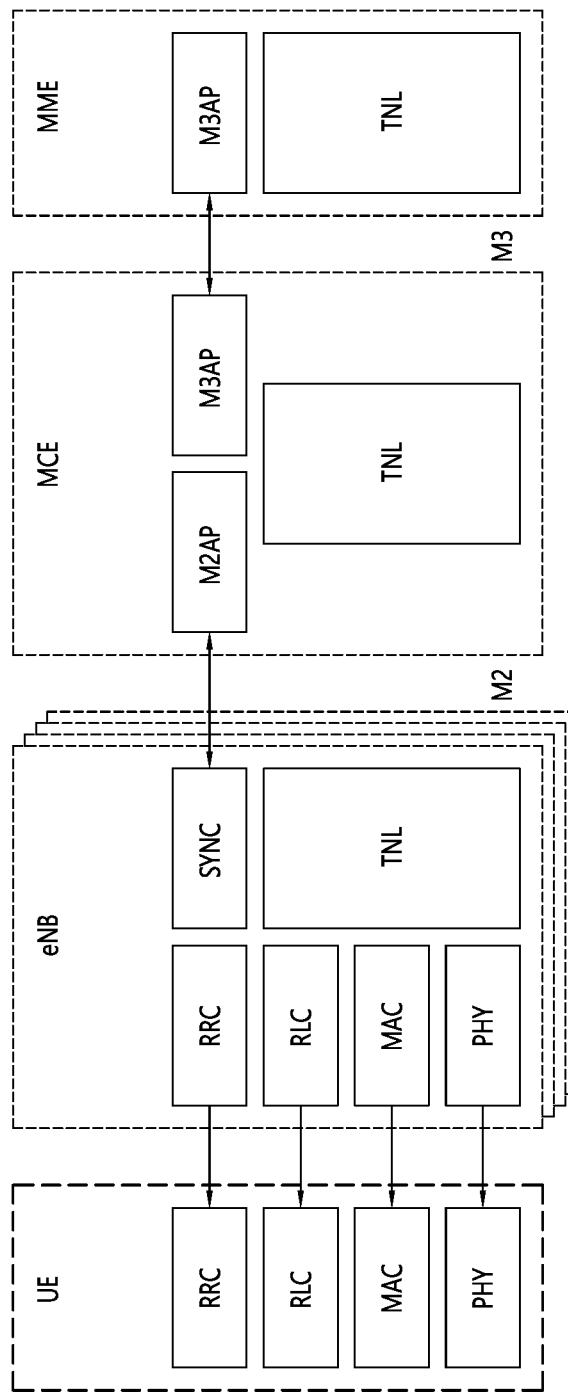
FIG. 14 shows the E-MBMS c-plane architecture to which implementations of the present disclosure is applied.

FIG. 14 shows the E-MBMS c-plane architecture to which implementations of the present disclosure is applied.

MCCH is terminated in the eNB on the network side. How to achieve the synchronisation of MCCH signalling is described below.

Hereinafter, MBMS Cells are described.

MBMS-dedicated cell.

Cells performing only MBMS transmissions are referred to as MBMS-dedicated cells.

UEs not supporting FeMBMS are not supported on these cells. Paging is not supported on an MBMS-dedicated cell.

For MBMS-dedicated cells:

MTCH and MCCH are mapped on MCH for MBSFN transmission;

MBMS-dedicated cells do not support unicast traffic in the downlink and these cells cannot be used as PCell or PSCell. System information required to receive MBMS from MBMS-dedicated cells is broadcasted on non-MBSFN subframes. The system information change notification as well as ETWS/CMAS notification are provided via L1 signalling on non-MBSFN subframes. The PBCH of MBMS-dedicated cell, uses a different scrambling sequence initialization than the PBCH of MBMS/Unicast-mixed cell which prevents UEs not supporting FeMBMS from camping on this cell.

MBMS/Unicast-mixed cell.

Cells performing both MBMS and unicast transmissions are referred to as MBMS/Unicast-mixed cells.

For MBMS/Unicast mixed cells:

MTCH and MCCH are mapped on MCH for MBSFN transmission;

SC-MTCH and SC-MCCH are mapped on DL-SCH for SC-PTM transmission;

Transmission of both unicast and MBMS in the cell is done in a co-ordinated manner FeMBMS/Unicast-mixed cell.

An FeMBMS/Unicast-mixed cell is an MBMS/Unicast-mixed cell that operates with at least one of the following:

subframes 4 or 9 or both configured as MBSFN subframes
subframes that may not contain unicast control region The FeMBMS/Unicast-mixed cell cannot be used as a PCell or PSCell. To provide unicast traffic on non-MBSFN subframes, such cell needs to be configured as an SCell. UEs not supporting FeMBMS are not supported on these cells and camping of such UEs is prevented by using cell barring mechanism of SIB1. Paging for incoming calls is not supported on such cells and system information change notification as well as ETWS/CMAS notification are provided with L1 signalling.

Technical features related to MBMS Transmission are described.

Transmission of a MBMS in E-UTRAN uses either MBSFN transmission or SC-PTM transmission. The MCE makes the decision on whether to use SC-PTM or MBSFN for each MBMS session.

Single-cell transmission of MBMS is characterized by:
MBMS is transmitted in the coverage of a single cell;
One SC-MCCH and one or more SC-MTCH(s) are mapped on DL-SCH;
Scheduling is done by the eNB;
SC-MCCH and SC-MTCH transmissions are each indicated by a logical channel specific RNTI on PDCCH (there is a one-to-one mapping between TMGI and G-RNTI used for the reception of the DL-SCH to which a SC-MTCH is mapped);
A single transmission is used for DL-SCH (i.e. neither blind HARQ repetitions nor RLC quick repeat) on which SC-MCCH or SC-MTCH is mapped;
SC-MCCH and SC-MTCH use the RLC-UM mode.

For each SC-MTCH, the following scheduling information is provided on SC-MCCH:
SC-MTCH scheduling cycle;
SC-MTCH on-duration: duration in downlink subframes that the UE waits for, after waking up from DRX, to receive PDCCHs. If the UE successfully decodes a PDCCH indicating the DL-SCH to which this SC-MTCH is mapped, the UE stays awake and starts the inactivity timer;
SC-MTCH inactivity-timer: duration in downlink subframes that the UE waits to successfully decode a PDCCH, from the last successful decoding of a PDCCH indicating the DL-SCH to which this SC-MTCH is mapped, failing which it re-enters DRX. The UE shall restart the inactivity timer following a single successful decoding of a PDCCH.

The SC-PTM reception opportunities are independent of the unicast DRX scheme.

The SC-MTCH inactivity-timer may be set to 0.

Although the above parameters are per SC-MTCH (i.e. per MBMS service), the network may configure the same scheduling pattern for multiple SC-MTCHs (i.e. multiple MBMS services).

For NB-IoT UEs, the definition of the above parameters does not apply.

For BL UEs and UEs in enhanced coverage, the definition of the above parameters does not apply.

For BL UEs, UEs in enhanced coverage and NB-IoT UEs, when multi-TB scheduling is configured, a single MPDCCH/NPDCCH can indicate scheduling of multiple downlink transmissions.

Multi-cell transmission of MBMS is characterized by:
Synchronous transmission of MBMS within its MBSFN Area;
Combining of MBMS transmission from multiple cells is supported;
Scheduling of each MCH is done by the MCE;
A single transmission is used for MCH (i.e. neither blind HARQ repetitions nor RLC quick repeat);
A single Transport Block is used per TTI for MCH transmission, that TB uses all the MBSFN resources in that subframe;
MTCH and MCCH can be multiplexed on the same MCH and are mapped on MCH for p-t-m transmission;
MTCH and MCCH use the RLC-UM mode;
The MAC subheader indicates the LCID for MTCH and MCCH;
The MBSFN Synchronization Area, the MBSFN Area, and the MBSFN cells are semi-statically configured e.g. by O&M;
MBSFN areas are static, unless changed by O&M (i.e. no dynamic change of areas);

The UE is not required to receive services from more than one MBSFN Area simultaneously and may support only a limited number of MTCHs.

Multiple MBMS services can be mapped to the same MCH and one MCH contains data belonging to only one MBSFN Area. An MBSFN Area contains one or more MCHs. An MCH specific MCS is used for all subframes of the MCH that do not use the MCS indicated in BCCH. All MCHs have the same coverage area.

For MCCH and MTCH, the UE shall not perform RLC re-establishment at cell change between cells of the same MBSFN area. Within the MBSFN subframes, all MCHs within the same MBSFN area occupy a pattern of subframes, not necessarily adjacent in time, that is, common for all these MCHs and is therefore called the Common Subframe Allocation (CSA) Pattern. The CSA pattern is periodically repeated with the CSA period. The actual MCH subframe allocation (MSA) for every MCH carrying MTCH is defined by the CSA pattern, the CSA period, and the MSA end, that are all signalled on MCCH. The MSA end indicates the last subframe of the MCH within the CSA period. Consequently, the MCHs are time multiplexed within the CSA period, which finally defines the interleaving degree between the MCHs. It shall be possible for MCHs to not use all MBSFN resources signalled as part of the Rel-8 MBSFN signalling. Further, such MBSFN resource can be shared for more than one purpose (MBMS, Positioning, etc.). During one MCH scheduling period (MSP), which is configurable per MCH, the eNB applies MAC multiplexing of different MTCHs and optionally MCCH to be transmitted on this MCH.

MCH scheduling information (MSI) is provided per MCH to indicate which subframes are used by each MTCH during the MSP, and to indicate whether transmission for an MTCH is going to be, or has been, suspended by the eNode B. The following principles are used for the MSI:
it is used both when services are multiplexed onto the MCH and when only a single service is transmitted on the MCH;
it is generated by the eNB and provided once at the beginning of the MSP;
it has higher scheduling priority than the MCCH and, when needed, it appears first in the PDU;

it allows the receiver to determine what subframes are used by every MTCH, sessions are scheduled in the order in which they are included in the MCCH session list;

it is carried in a MAC control element which cannot be segmented;

it carries the mapping of MTCHs to the subframes of the associated MSP. This mapping is based on the indexing of subframes belonging to one MSP;

it carries an indication of whether the transmission of an MTCH is to be suspended by the eNode B.

The content synchronization for multi-cell transmission is provided by the following principles:

1. All eNBs in a given MBSFN Synchronization Area have a synchronized radio frame timing such that the radio frames are transmitted at the same time and have the same SFN.

2. All eNBs have the same configuration of RLC/MAC/PHY for each MBMS service, and identical information (e.g. time information, transmission order/priority information) such that synchronized MCH scheduling in the eNBs is ensured. These are indicated in advance by the MCE.

3. An E-MBMS GW sends/broadcasts MBMS packet with the SYNC protocol to each eNB transmitting the service.

4. The SYNC protocol provides additional information so that the eNBs identify the transmission radio frame(s). The E-MBMS GW does not need accurate knowledge of radio resource allocation in terms of exact time division (e.g. exact start time of the radio frame transmission).

5. eNB buffers MBMS packet and waits for the transmission timing indicated in the SYNC protocol.

6. The segmentation/concatenation is needed for MBMS packets and should be totally up to the RLC/MAC layer in eNB.

7. The SYNC protocol provides means to detect packet loss(es) and supports a recovery mechanism robust against loss of consecutive PDU packets (MBMS Packets with SYNC Header).

8. For the packet loss case the transmission of radio blocks potentially impacted by the lost packet should be muted.

9. The mechanism supports indication or detection of MBMS data burst termination (e.g. to identify and alternately use available spare resources related to pauses in the MBMS PDU data flow).

10. If two or more consecutive SYNC SDUs within a SYNC bearer are not received by the eNB, or if no SYNC PDUs of Type 0 or 3 are received for some synchronization sequence, the eNB may mute the exact subframes impacted by lost SYNC PDUs using information provided by SYNC protocol. If not muting only those exact subframes, the eNB stops transmitting the associated MCH from the subframe corresponding to the consecutive losses until the end of the corresponding MSP and it does not transmit in the subframe corresponding to the MSI of that MSP.

11. The eNB sets VT(US) to zero in the RLC UM entity corresponding to an MCCH at its modification period boundary.

12. The eNB sets VT(US) to zero in each RLC UM entity corresponding to an MTCH at the beginning of its MSP.

13. The eNB sets every bit in the MAC padding on MCH to "0".

14. The eNB's RLC concatenates as many RLC SDUs from the same radio bearer as possible.

15. The eNB's MAC multiplexes as many RLC PDUs as fit in the Transport Block.

16. The eNB sets every padding bit in the RLC UM PDU corresponding to an MTCH or MCCH to "0".

17. A MAC PDU including a MAC subheader for a MTCH MAC SDU always includes non-zero size of MTCH MAC SDU.

18. A MAC PDU including a MAC subheader for a MSI MAC control element always includes non-zero size of MSI MAC control element.

UEs that are receiving MTCH and/or SC-MTCH transmissions can be in RRC_IDLE or except for NB-IoT UEs, BL UEs or UEs in enhanced coverage, in RRC_CONNECTED state.

UEs except for NB-IoT UEs, BL UEs or UEs in enhanced coverage that are receiving MTCH can also be in Receive Only Mode.

The following principles govern the SC-MCCH structure:

there is one SC-MCCH per cell;

the SC-MCCH is sent on DL-SCH;

the SC-MCCH provides the list of all MBMS services with ongoing sessions transmitted on SC-MTCH(s), including for each MBMS service TMGI and optional session ID, associated G-RNTI and scheduling information;

SC-MCCH is transmitted by RRC every SC-MCCH repetition period;

SC-MCCH uses a modification period;

Except for NB-IoT UEs, BL UEs or UEs in enhanced coverage a notification mechanism is used to announce changes of SC-MCCH due to Session Start:

The notification is sent in the first subframe in a repetition period where the SC-MCCH can be scheduled. The notification is sent using the DCI format 1C with SC-N-RNTI and one bit within the 8-bit bitmap;

When the UE receives a notification, it acquires the SC-MCCH in the same subframe;

For NB-IoT UEs, BL UEs or UEs in enhanced coverage:

Two notification mechanisms are used to announce changes of SC-MCCH due to Session Start:

A notification is sent in the DCI with SC-RNTI scheduling SC-MCCH. When the UE receives the notification, it acquires the SC-MCCH in the same modification period;

A notification is sent in the DCI with G-RNTI scheduling SC-MTCH. When the UE receives the notification, it acquires the SC-MCCH in the next modification period;

One notification mechanism is used to announce changes of SC-MCCH for the ongoing service:

The notification is sent in the DCI with G-RNTI scheduling SC-MTCH.

When the UE receives the notification, it acquires the SC-MCCH in the next modification period.

The UE detects changes to SC-MCCH which are not announced by the notification mechanism by SC-MCCH monitoring at the modification period.

Hereinafter, technical features related to service continuity are described.

Mobility procedures for MBMS reception allow the UE to start or continue receiving MBMS service(s) via MBSFN or SC-PTM when changing cell(s). For each MBMS service provided using SC-PTM, E-UTRAN indicates in the SC-MCCH the list of neighbour cells providing this MBMS service so that the UE can request unicast reception of the service before changing to a cell not providing the MBMS service using SC-PTM.

For MBSFN transmission, E-UTRAN procedures provide support for service continuity with respect to mobility within the same MBSFN area. Within the same geographic area, MBMS services can be provided on more than one frequency and the frequencies used to provide MBMS services may change from one geographic area to another within a PLMN.

UEs that are receiving MBMS service(s) in RRC_IDLE state performing cell reselection or are in RRC_CONNECTED state obtain target cell (SC-)MTCH information from the target cell (SC-)MCCH.

Hereinafter, terms used for the present disclosure are described. Sections 3 and 4 of 3GPP TR 23.757 v1.2.0 may be referred.

Broadcast communication service: A communication service in which the same service and the same specific content data are provided simultaneously to all UEs in a geographical area (i.e., all UEs in the broadcast coverage area are authorized to receive the data).

For the broadcast communication service, the content provider and network may not be aware whether the authorized UEs are actually receiving the data being delivered.

Broadcast service area: The area within which data of one or multiple Broadcast session(s) are sent.

Broadcast session: A session to deliver the broadcast communication service. A broadcast session is characterised by the content to send and the geographical area where to distribute it.

Service Announcement: Mechanism to inform users about one or several available MB services.

Multicast service area: The area within which data of one or multiple Multicast session(s) are sent.

MBS session: A multicast session or a broadcast session.

MBS QoS Flow: The finest granularity for QoS forwarding treatment for MBS data. Providing different QoS forwarding treatment requires separate MBS QoS Flow in SMBS system.

transport only mode: MBS system transports data/content from the content provider to the content receiver in a transparent manner Multicast communication service: A communication service in which the same service and the same specific content data are provided simultaneously to a dedicated set of UEs (i.e., not all UEs in the multicast coverage are authorized to receive the data).

For multicast communication service, the content provider and network can be aware whether the authorized UEs are actually receiving the data being delivered.

The transport in the 5GC for broadcast and multicast services will be determined as part of this study. A multicast communication service could for instance use a lower layer unicast or multicast transfer in the 5GC and the access interfaces.

Multicast session: A session to deliver the multicast communication service. A multicast session is characterised by the content to send, by the list of UEs that may receive the service and optionally by a multicast area where to distribute it.

Receive Only Mode: A UE configuration option that allows a UE to receive only broadcast service without the need to access and register with the PLMN offering the MBS service. Use of Receive Only Mode does not require USIM for the UE.

Shared MBS Network: A network shared by multiple PLMNs that provides multicast or broadcast services. At least the northbound data entrance point in the 5GS is shared.

5GC Individual MBS traffic delivery: 5G CN receives a single copy of MBS data packets and delivers separate copies of those MBS data packets to individual UEs via per-UE PDU sessions, hence for each such UE one PDU session is required to be associated with a multicast session.

5GC shared MBS traffic delivery: 5G CN receives a single copy of MBS data packets and delivers a single copy of those MBS data packets to a RAN node.

For 5GC shared MBS traffic delivery the RAN node either delivers a single copy of MBS data packets over radio to a set of UEs (PTM) or delivers separate copies of MBS data packets over radio to individual UEs (PTP).

Figure 15:
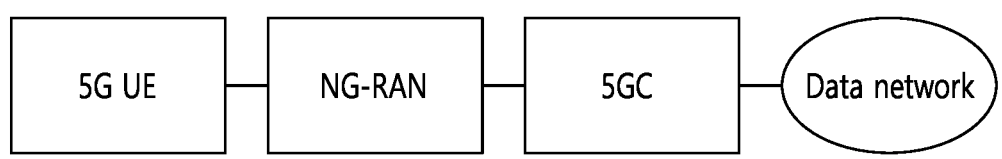
FIG. 15 shows high level MBS architecture to which implementations of the present disclosure is applied.

FIG. 15 shows high level MBS architecture to which implementations of the present disclosure is applied.

The following common architectural requirements and principles apply:

Solutions shall build on the 5G System architectural principles including flexibility and modularity for newly introduced functionalities.

The system shall provide an efficient transport for a variety of multicast and broadcast services.

Solutions shall minimize impact to existing external services.

Only NR of NG-RAN connected to 5GC is considered as RAT.

Architecture reference models are used as the baseline architecture for supporting multicast and broadcast services in this study. In particular, FIG. 15 shows the MBS architecture with 5G UE, NG-RAN and 5GC.

Whether a solution supports IP traffic and/or other types of traffic will be analysed in Evaluation and Conclusions stage.

Specific architectural requirements and principles are described.

The following IPTV requirements and principles apply:

Solutions to IPTV shall minimize the impact to IPTV network and STB.

Solutions to IPTV STB shall reuse IGMP/MLD message via user plane to join/leave an IPTV channel group.

Solutions to IPTV shall provide an efficient mechanism for the UE to join/leave an IP channel group, including reducing latency and signalling.

Baseline functionality is described.

The sequence to establish and deliver an MBS session is assumed as follows:

1. Optional delivery of 5G MBS service info from application/service layer to 5GC.

NOTE 1: A framework to deliver 5G MBS service info to 5G CN is available. However, this step may be replaced by pre-agreements without explicit signalling.

2. UEs participate in receiving MBS flow i.e. UE requests to join an MBS session (for Multicast session).

3. Establishment of MBS flow transport.

Step 3 may happen before step 2 for individual UEs joining an MBS session which is already started.

4. MBS data delivery to UEs.

5. UEs stop receiving MBS flow (for Multicast session).

6. Release of MBS flow transport (what used to be session stop).

MBS Traffic delivery methods are described.

Figure 16:
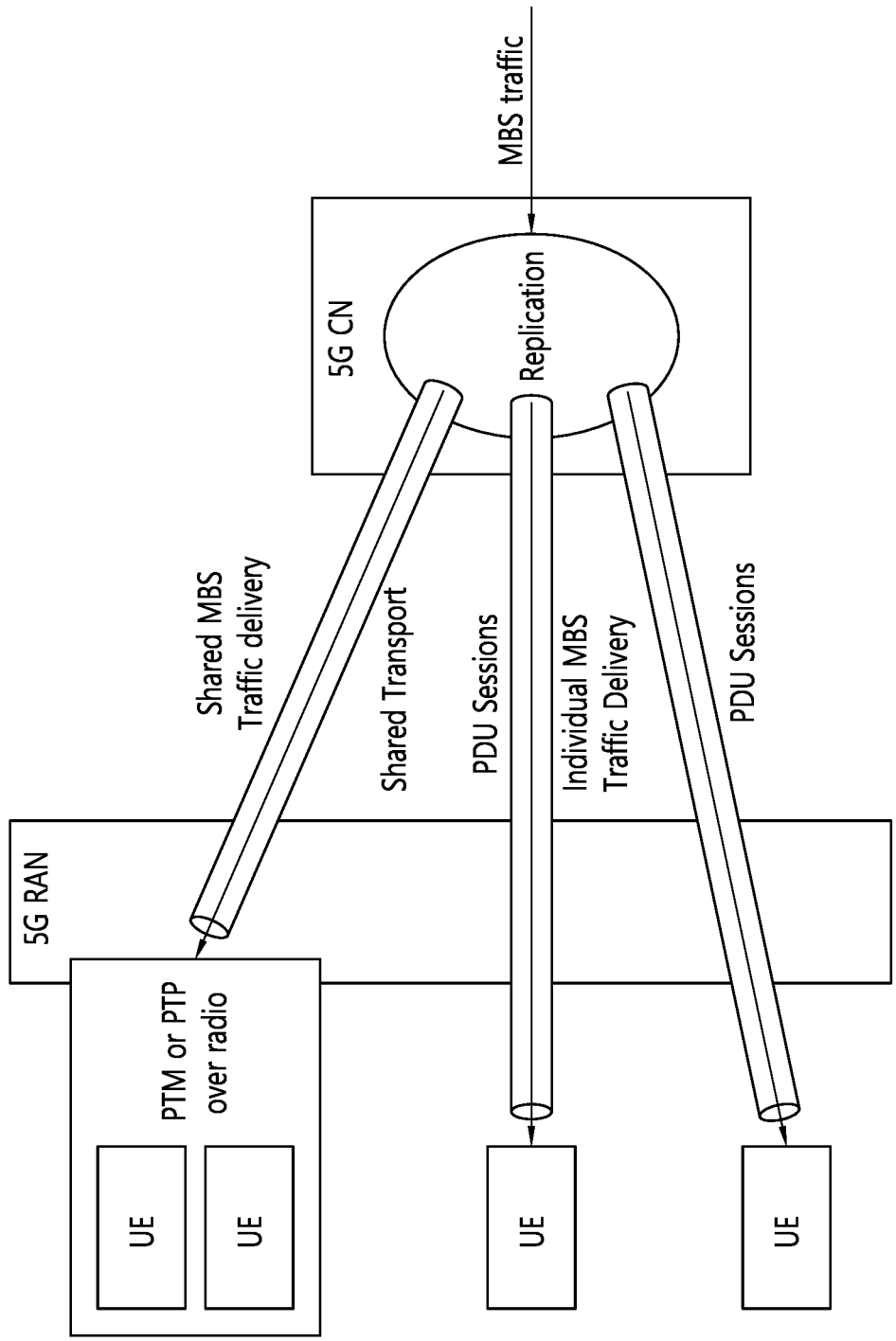
FIG. 16 shows a delivery methods to which implementations of the present disclosure is applied.

FIG. 16 shows a delivery methods to which implementations of the present disclosure is applied.

MBS traffic needs to be delivered from a single data source (Application Service Provider) to multiple UEs. Depending on many factors, multiple delivery methods may be used to deliver MBS traffic in the SGS. For clarity, delivery methods are not referred to as unicast/multicast/broadcast but as described below.

The term "unicast delivery" refers to a mechanism by which application data and signalling between the UE and the application server are delivered using PDU Session within the 3GPP network and using individual UE and application server addresses (e.g. IP addresses) between the 3GPP network and the application server. It is not equivalent to 5GC Individual MBS traffic delivery method defined in this clause.

From the view point of 5G CN, two delivery methods are possible for MBS multicast service:

5GC Individual MBS traffic delivery method: 5G CN receives a single copy of MBS data packets and delivers separate copies of those MBS data packets to individual UEs via per-UE PDU sessions, hence for each such UE one PDU session is required to be associated with a multicast session.

5GC Shared MBS traffic delivery method: 5G CN receives a single copy of MBS data packets and delivers a single copy of those MBS packets packet to a RAN node, which then delivers them to one or multiple UEs If 5GC Individual MBS traffic delivery method is supported, a same received single copy of MBS data packets by the CN may be delivered via both 5GC Individual MBS traffic delivery method for some UE(s) and 5GC Shared MBS traffic delivery method for other UEs.

From the viewpoint of RAN, (in the case of the shared delivery) two delivery methods are available for the transmission of MBS packet flows over radio:

Point-to-Point (PTP) delivery method: a RAN node delivers separate copies of MBS data packet over radio to individual UE.

Point-to-Multipoint (PTM) delivery method: a RAN node delivers a single copy of MBS data packets over radio to a set of UEs.

A RAN node may use a combination of PTP/PTM to deliver an MBS packet to UEs.

The PTP and PTM delivery methods are defined in RAN WGs and they are listed here for reference only.

As depicted in FIG. 16, PTP or PTM delivery (with 5GC shared delivery method) and 5GC Individual delivery method may be used at the same time for a multicast MBS session.

For MBS broadcast service, only 5GC Shared MBS traffic delivery method with PTM delivery is applicable.

Meanwhile, if any Medium Access Control (MAC) entity receives a MAC service data unit (SDU) for Dedicated Traffic Channel (DTCH) logical channel, Dedicated Control Channel (DCCH) logical channel, or Common Control Channel (CCCH) logical channel, the MAC entity may start or restart the data inactivity timer.

If the data inactivity timer expires, the MAC may indicate the expiry of the data inactivity timer to RRC layers. Upon receiving the expiry of data inactivity timer from MAC layer while in RRC_CONNECTED, the UE may go to RRC_IDLE state.

Logical channels for a multicast/broadcast session (for example, MTCH) can be divided into two types, (1) a logical channel a multicast/broadcast session that can be received in RRC_IDLE and (2) a logical channel a multicast/broadcast session that cannot be received in RRC_IDLE. Thus, different handling may be required for the data inactivity timer based on the type of the logical channel for multicast/broadcast session when UE receives MAC SDU for the logical channel for multicast/broadcast session.

Therefore, studies for handling of a data inactivity timer for MBS session in a wireless communication system are required.

Hereinafter, a method for handling of a data inactivity timer for MBS session in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 17:
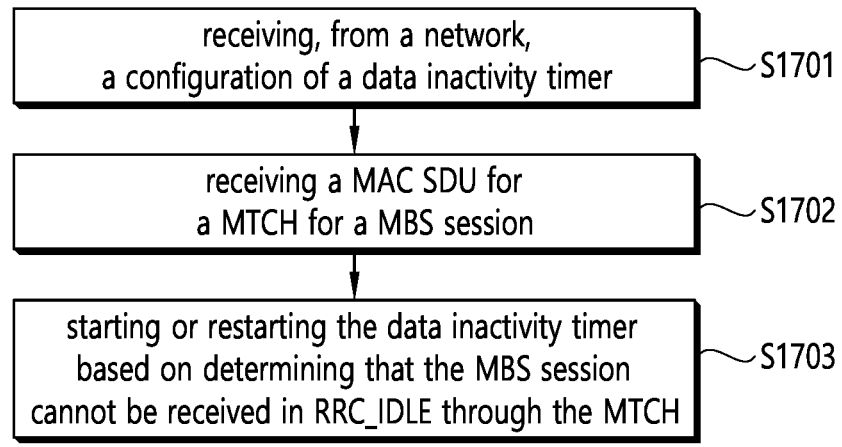
FIG. 17 shows an example of a method for handling of a data inactivity timer for MBS session in a wireless communication system, according to some embodiments of the present disclosure.

FIG. 17 shows an example of a method for handling of a data inactivity timer for MBS session in a wireless communication system, according to some embodiments of the present disclosure.

In particular, FIG. 17 shows an example of a method performed by a wireless device in a wireless communication system.

In step S1701, a wireless device may receive, from a network, a configuration of a data inactivity timer.

For example, the configuration may include information on a value for the data inactivity timer.

For example, the configuration may include a MAC-Cell Group Configuration which is used to configure MAC parameters for a cell group.

In step S1702, a wireless device receive a Medium Access Control Service Data Unit (MAC SDU) for a Multicast Traffic Channel (MTCH) for a MBS session.

For example, the MBS session may be a Multicast session or a Broadcast session.

For example, a wireless device may receive a radio signal including the MAC PDU from the network. The wireless device may decode the received radio signal and acquire the MAC SDU from the MAC SDU. For example, a MAC entity or a MAC layer of the wireless device could acquire the MAC SDU.

For example, the network may provide the MBS session. For example, a wireless device may receive the MAC SDU for the MBS session from the network through the MTCH.

In step S1703, a wireless device may start or restart the data inactivity timer based on determining that the MBS session cannot be received in RRC_IDLE through the MTCH.

For example, a wireless device may skip to start or restart the data inactivity timer based on determining that the MBS session can be received in RRC_IDLE through the MTCH.

For example, it may be determined that a Multicast session among the MBS session cannot be received in RRC_IDLE. In other words, a wireless device may start or restart the data inactivity timer based on determining that the MBS session is a Multicast session.

For example, it may be determined that a Broadcast session among the MBS session can be received in RRC_IDLE. In other words, a wireless device may skip to start or restart the data inactivity timer based on determining that the MBS session is a Broadcast session.

For example, a wireless device may go to RRC_IDLE upon expiry of the data inactivity timer. For example, a Medium Access Control (MAC) layer of the wireless device may transmit, to a Radio Resource Control (RRC) layer of the wireless device, information informing expiry of the data inactivity timer. Then, the RRC layer of the wireless device, may go to RRC_IDLE upon receiving the information informing the expiry of the data inactivity timer.

In other words, a wireless device may receive the MAC SDU for the MTCH for the MBS session while in RRC_CONNECTED. The wireless device may enter into RRC_IDLE, when the data inactivity timer is expired (that is, the data inactivity timer is not started or restarted).

According to some embodiments of the present disclosure, the MTCH may include (1) a first MTCH through which the MBS session cannot be received in RRC_IDLE or (2) a second MTCH through which the MBS session can be received in RRC_IDLE.

For example, a wireless device may start or restart the data inactivity timer upon receiving a MAC SDU via the first MTCH.

For example, a wireless device may skip to start or restart the data inactivity timer upon receiving a MAC SDU via the second MTCH.

In this case, the first MTCH may be for a Multicast session. The second MTCH may be for a Broadcast session.

In other words, there may be more than two MTCHs. One MTCH for the MBS session which cannot be received in RRC_IDLE, and the other one MTCH for the MBS session which can be received in RRC_IDLE. For example, there may be one MTCH for the Multicast session, and the other one MTCH for the Broadcast session.

For example, a logical channel may be defined by the type of information it carries. Therefore, if a MAC SDU is transmitted via the MTCH for the Multicast session, the MAC SDU is for the Multicast session. If a MAC SDU is transmitted via the MTCH for the Broadcast session, the MAC SDU is for the Broadcast session.

Thus, when a wireless device receives a MAC SDU via the MTCH for the Multicast session, the wireless device may start or restart the data inactivity timer. Thus, the wireless device could receive the Multicast session in RRC_CONNECTED without going in RRC_IDLE.

Alternatively, when a wireless device receives a MAC SDU via the MTCH for the Broadcast session, the wireless device may skip to start or restart the data inactivity timer. Thus, the wireless device could go in RRC_IDLE upon expiry of the data inactivity timer. Since the wireless device could receive the Broadcast session while in RRC_IDLE, the wireless device could save the power.

According to some embodiments of the present disclosure, the wireless device may be in communication with at least one of a user equipment, a network, or an autonomous vehicle other than the wireless device.

Hereinafter, examples of methods for handling of a data inactivity timer for MBS session in a wireless communication system will be described.

According to some embodiments of the present disclosure, when UE receives a MAC SDU for logical channel for a multicast/broadcast session (for example, a MBS session), the UE may determine whether to start or restart the data inactivity timer based on type of the multicast/broadcast session.

For example, when UE receives a MAC SDU for logical channel for type #1 multicast/broadcast session, the UE may start or restart the data inactivity timer. Due to starting or restarting of the data inactivity timer, expiry of the data inactivity timer can be delayed so that UE remains in RRC_CONNECTED.

For example, when UE receives a MAC SDU for logical channel for type #2 multicast/broadcast session (that is, different type with the type #1 multicast/broadcast session), the UE may not start or restart the data inactivity timer. Due to not starting or restarting of the data inactivity timer, the data inactivity timer may expire rather sooner so that UE can enter RRC_IDLE sooner to save power.

According to some embodiments of the present disclosure, the multicast/broadcast session may be transmitted via multicast/broadcast specific logical channel, for example, MTCH.

According to some embodiments of the present disclosure, the type of the multicast/broadcast session can be determined based on the whether the multicast/broadcast session can be received in RRC_IDLE or not. That is, UE may determine whether to start or restart the data inactivity timer upon receiving MAC SDU for multicast/broadcast session based on whether the multicast/broadcast session can be received in RRC_IDLE or not.

For example, when UE receives a MAC SDU for logical channel for a multicast/broadcast session and the multicast/broadcast session cannot be received in RRC_IDLE, the UE may start or restart the data inactivity timer.

For example, when UE receives a MAC SDU for logical channel for a multicast/broadcast session and the multicast/broadcast session can be received in RRC_IDLE, the UE may not start or restart the data inactivity timer.

For each multicast/broadcast session or each logical channel for multicast/broadcast session (for example, MTCH), a type indication may be provided to UE to indicate whether the multicast/broadcast session can be received in RRC_IDLE or not. For example, UE in RRC_IDLE can receive the type #1 multicast/broadcast session meanwhile cannot receive the type #2 multicast/broadcast session.

For example, if a multicast session is transmitted via MTCH1 and the multicast session is not allowed to be received in RRC_IDLE, and if a broadcast session is transmitted via MTCH2 and the broadcast session is allowed to be received in RRC_IDLE, UE may start or restart the data inactivity timer upon receiving a MAC SDU for MTCH1, while may not start or restart the data inactivity timer upon receiving a MAC SDU for MTCH2. In other word, the data inactivity timer can start or restart per logical channel for multicast/broadcast session.

According to some embodiments of the present disclosure, the type of the multicast/broadcast session could be determined based on the whether the uplink feedback based re-transmission (for example, HARQ re-transmission or PDCP status report) is configured or not for the multicast/broadcast session.

For example, when UE receives a MAC SDU for logical channel for a multicast/broadcast session and the uplink feedback based re-transmission is configured for the multicast/broadcast session, the UE may start or restart the data inactivity timer.

For example, when UE receives a MAC SDU for logical channel for a multicast/broadcast session and the uplink feedback based re-transmission is not configured for the multicast/broadcast session, the UE may not start or restart the data inactivity timer.

For example, if the uplink feedback based re-transmission (for example, HARQ re-transmission or PDCP status report) is configured for multicast session1 that is transmitted via MTCH1 but it is not configured for multicast session2 that is transmitted via MTCH2, UE may start or restart the data inactivity timer upon receiving a MAC SDU for MTCH1, while may not start or restart the data inactivity timer upon receiving a MAC SDU for MTCH2.

Hereinafter, examples for operation related to data inactivity monitoring according to some embodiments of the present disclosure is described.

For example, the UE may be configured by RRC with a Data inactivity monitoring functionality, when in RRC_CONNECTED. RRC controls Data inactivity operation by configuring the timer dataInactivityTimer.

When dataInactivityTimer is configured, the UE shall:
1> if any MAC entity receives a MAC SDU for DTCH logical channel, DCCH logical channel, or CCCH logical channel; or
1> if any MAC entity receives a MAC SDU for MTCH logical channel and this MTCH logical channel cannot be received in RRC_IDLE; or
1> if any MAC entity transmits a MAC SDU for DTCH logical channel, or DCCH logical channel:
2> start or restart dataInactivityTimer.
1> if the dataInactivityTimer expires:
2> indicate the expiry of the dataInactivityTimer to upper layers.

For other example, the UE may be configured by RRC with a Data inactivity monitoring functionality, when in RRC_CONNECTED. RRC controls Data inactivity operation by configuring the timer dataInactivityTimer.

When dataInactivityTimer is configured, the UE shall:
1> if any MAC entity receives a MAC SDU for DTCH logical channel, DCCH logical channel, or CCCH logical channel; or
1> if any MAC entity receives a MAC SDU for MTCH logical channel and this MTCH logical channel can only be received in RRC_CONNECTED; or
1> if any MAC entity transmits a MAC SDU for DTCH logical channel, or DCCH logical channel:
2> start or restart dataInactivityTimer.
1> if the dataInactivityTimer expires:
2> indicate the expiry of the dataInactivityTimer to upper layers.

For other example, the UE may be configured by RRC with a Data inactivity monitoring functionality, when in RRC_CONNECTED. RRC controls Data inactivity operation by configuring the timer dataInactivityTimer.

When dataInactivityTimer is configured, the UE shall:
1> if any MAC entity receives a MAC SDU for DTCH logical channel, DCCH logical channel, CCCH logical channel, or MTCH logical channel for multicast session; or
1> if any MAC entity transmits a MAC SDU for DTCH logical channel, or DCCH logical channel:
2> start or restart dataInactivityTimer.
1> if the dataInactivityTimer expires:
2> indicate the expiry of the dataInactivityTimer to upper layers.

Some of the detailed steps shown in the example of FIG. 17 may not be essential steps and may be omitted. In addition, steps other than the steps shown in FIG. 17 may be added, and the order of the steps may vary. Some of the above steps may have their own technical meaning.

Hereinafter, an apparatus for handling of a data inactivity timer for MBS session in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, a configuration of a data inactivity timer. The processor 102 may be configured to control the transceiver 106 to receive a Medium Access Control Service Data Unit (MAC SDU) for a Multicast Traffic Channel (MTCH) for a MBS session. The processor 102 may be configured to start or restart the data inactivity timer based on determining that the MBS session cannot be received in RRC_IDLE through the MTCH.

For example, the MBS session may be a Multicast session or a Broadcast session.

For example, it may be determined that a Multicast session among the MBS session cannot be received in RRC_IDLE. For other example, it may be determined that a Broadcast session among the MBS session can be received in RRC_IDLE.

For example, the processor 102 may be configured to skip to start or restart the data inactivity timer based on determining that the MBS session can be received in RRC_IDLE through the MTCH.

For example, the processor 102 may be configured to go to RRC_IDLE upon expiry of the data inactivity timer. For example, the processor 102 may be configured to control a Medium Access Control (MAC) layer of the wireless device to transmit, to a Radio Resource Control (RRC) layer of the wireless device, information informing expiry of the data inactivity timer. Then, the processor 102 may be configured to control the RRC layer of the wireless device to go to RRC_IDLE upon receiving the information informing the expiry of the data inactivity timer.

For example, the configuration may include information on a value for the data inactivity timer. For example, the configuration may include a MAC-Cell Group Configuration which is used to configure MAC parameters for a cell group.

According to some embodiments of the present disclosure, the MTCH may include (1) a first MTCH through which the MBS session cannot be received in RRC_IDLE or (2) a second MTCH through which the MBS session can be received in RRC_IDLE.

For example, the processor 102 may be configured to start or restart the data inactivity timer upon receiving a MAC SDU via the first MTCH. For example, the processor 102 may be configured to skip to start or restart the data inactivity timer upon receiving a MAC SDU via the second MTCH.

For example, the first MTCH may be for a Multicast session. The second MTCH may be for a Broadcast session.

According to some embodiments of the present disclosure, the processor 102 may be configured to be in communication with at least one of a user equipment, a network, or an autonomous vehicle other than the wireless device.

Hereinafter, a processor for a wireless device for handling of a data inactivity timer for MBS session in a wireless communication system, according to some embodiments of the present disclosure, will be described.

The processor may be configured to control the wireless device to receive, from a network, a configuration of a data inactivity timer. The processor may be configured to control the wireless device to receive a Medium Access Control Service Data Unit (MAC SDU) for a Multicast Traffic Channel (MTCH) for a MBS session. The processor may be configured to control the wireless device to start or restart the data inactivity timer based on determining that the MBS session cannot be received in RRC_IDLE through the MTCH.

For example, the MBS session may be a Multicast session or a Broadcast session.

For example, it may be determined that a Multicast session among the MBS session cannot be received in RRC_IDLE. For other example, it may be determined that a Broadcast session among the MBS session can be received in RRC_IDLE.

For example, the processor may be configured to control the wireless device to skip to start or restart the data inactivity timer based on determining that the MBS session can be received in RRC_IDLE through the MTCH.

For example, the processor may be configured to control the wireless device to go to RRC_IDLE upon expiry of the data inactivity timer. For example, the processor may be configured to control a Medium Access Control (MAC) layer of the wireless device to transmit, to a Radio Resource Control (RRC) layer of the wireless device, information informing expiry of the data inactivity timer. Then, the processor may be configured to control the RRC layer of the wireless device to go to RRC_IDLE upon receiving the information informing the expiry of the data inactivity timer.

For example, the configuration may include information on a value for the data inactivity timer. For example, the configuration may include a MAC-Cell Group Configuration which is used to configure MAC parameters for a cell group.

According to some embodiments of the present disclosure, the MTCH may include (1) a first MTCH through which the MBS session cannot be received in RRC_IDLE or (2) a second MTCH through which the MBS session can be received in RRC_IDLE.

For example, the processor may be configured to control the wireless device to start or restart the data inactivity timer upon receiving a MAC SDU via the first MTCH. For example, the processor may be configured to control the wireless device to skip to start or restart the data inactivity timer upon receiving a MAC SDU via the second MTCH.

For example, the first MTCH may be for a Multicast session. The second MTCH may be for a Broadcast session.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for handling of a data inactivity timer for MBS session in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, a configuration of a data inactivity timer. The stored a plurality of instructions may cause the wireless device to receive a Medium Access Control Service Data Unit (MAC SDU) for a Multicast Traffic Channel (MTCH) for a MBS session. The stored a plurality of instructions may cause the wireless device to start or restart the data inactivity timer based on determining that the MBS session cannot be received in RRC_IDLE through the MTCH.

For example, the MBS session may be a Multicast session or a Broadcast session.

For example, it may be determined that a Multicast session among the MBS session cannot be received in RRC_IDLE. For other example, it may be determined that a Broadcast session among the MBS session can be received in RRC_IDLE.

For example, the stored a plurality of instructions may cause the wireless device to skip to start or restart the data inactivity timer based on determining that the MBS session can be received in RRC_IDLE through the MTCH.

For example, the stored a plurality of instructions may cause the wireless device to go to RRC_IDLE upon expiry of the data inactivity timer. For example, the stored a plurality of instructions may cause a Medium Access Control (MAC) layer of the wireless device to transmit, to a Radio Resource Control (RRC) layer of the wireless device, information informing expiry of the data inactivity timer. Then, the stored a plurality of instructions may cause the RRC layer of the wireless device to go to RRC_IDLE upon receiving the information informing the expiry of the data inactivity timer.

For example, the configuration may include information on a value for the data inactivity timer. For example, the configuration may include a MAC-Cell Group Configuration which is used to configure MAC parameters for a cell group.

According to some embodiments of the present disclosure, the MTCH may include (1) a first MTCH through which the MBS session cannot be received in RRC_IDLE or (2) a second MTCH through which the MBS session can be received in RRC_IDLE.

For example, the stored a plurality of instructions may cause the wireless device to start or restart the data inactivity timer upon receiving a MAC SDU via the first MTCH. For example, the stored a plurality of instructions may cause the wireless device to skip to start or restart the data inactivity timer upon receiving a MAC SDU via the second MTCH.

For example, the first MTCH may be for a Multicast session. The second MTCH may be for a Broadcast session.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for a data inactivity timer for MBS session in a wireless communication system, according to some embodiments of the present disclosure, will be described.

The BS may transmit, to a wireless device, a configuration of a data inactivity timer. The BS may transmit, to the wireless device, a Medium Access Control Service Data Unit (MAC SDU) for a Multicast Traffic Channel (MTCH) for a MBS session. The data inactivity timer may start or restart based on that the wireless device cannot receive the MBS session in RRC_IDLE through the MTCH.

Hereinafter, a base station (BS) for a data inactivity timer for MBS session in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, a configuration of a data inactivity timer. The processor may be configured to control the transceiver to transmit, to the wireless device, a Medium Access Control Service Data Unit (MAC SDU) for a Multicast Traffic Channel (MTCH) for a MBS session. The data inactivity timer may start or restart based on that the wireless device cannot receive the MBS session in RRC_IDLE through the MTCH.

The present disclosure can have various advantageous effects.

According to some embodiments of the present disclosure, a wireless device could handle a data inactivity timer for MBS session efficiently.

For example, if a wireless device is receiving a MBS session (that is, a multicast session or a broadcast session) in RRC_CONNECTED and the MBS session cannot be received in RRC_IDLE, the wireless device could keep receiving the MBS session in RRC_CONNECTED by restarting the data inactivity timer upon receiving the MBS session.

For other example, if a wireless device is receiving a multicast/broadcast session in RRC_CONNECTED and the multicast/broadcast session can be received in RRC_IDLE, the wireless device could save power by going to RRC_IDLE when the inactivity timer expires.

According to some embodiments of the present disclosure, a wireless communication system could efficiently provide a MBS session to a wireless device in RRC_CONNECTED or RRC_IDLE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   receiving, from a network, a configuration of a data inactivity timer;
   receiving a Medium Access Control Service Data Unit (MAC SDU) for a Multicast/Broadcast Services (MBS) Traffic Channel (MTCH),
   wherein the MTCH is a logical channel for an MBS session which cannot be received in RRC_IDLE; and
   starting or restarting the data inactivity timer based on receiving the MAC SDU for the MTCH.

2. The method of claim 1, wherein the MBS session is a Multicast session or a Broadcast session.

3. The method of claim 1, wherein it is determined that a Multicast session among the MBS session, which cannot be received in RRC_IDLE, is a Multicast session.

4. The method of claim 1, wherein the MBS session, which can be received in RRC_IDLE, is a Broadcast session.

5. The method of claim 1, wherein the method further comprises,
   skipping to start or restart the data inactivity timer based on determining that the MBS session can be received in RRC_IDLE through the MTCH.

6. The method of claim 1, wherein the method further comprising:
   transmitting, by a Medium Access Control (MAC) layer of the wireless device to a Radio Resource Control (RRC) layer of the wireless device, information informing expiry of the data inactivity timer; and
   going, by the RRC layer of the wireless device, to RRC_IDLE upon receiving the information informing the expiry of the data inactivity timer.

7. The method of claim 1, wherein the configuration includes information on a value for the data inactivity timer.

8. The method of claim 1, wherein the configuration includes a MAC-Cell Group Configuration which is used to configure MAC parameters for a cell group.

9. The method of claim 1, wherein the MTCH includes (1) a first MTCH through which the MBS session cannot be received in RRC_IDLE or (2) a second MTCH through which the MBS session can be received in RRC_IDLE.

10. The method of claim 9, wherein the starting or restarting the data inactivity timer comprising:
    starting or restarting the data inactivity timer upon receiving a MAC SDU via the first MTCH.

11. The method of claim 9, wherein the method further comprising:
    skipping to start or restart the data inactivity timer upon receiving a MAC SDU via the second MTCH.

12. The method of claim 9, wherein the first MTCH is for a Multicast session.

13. The method of claim 9, wherein the second MTCH is for a Broadcast session.

14. The method of claim 1, wherein the wireless device is in communication with at least one of a user equipment, a network, or an autonomous vehicle other than the wireless device.

15. A wireless device in a wireless communication system comprising:
- a transceiver;
- a memory; and
- at least one processor operatively coupled to the transceiver and the memory, and configured to:
- control the transceiver to receive, from a network, a configuration of a data inactivity timer;
- control the transceiver to receive a Medium Access Control Service Data Unit (MAC SDU) for a Multicast/Broadcast Services (MBS) Traffic Channel (MTCH),
- wherein the MTCH is a logical channel for an MBS session which cannot be received in RRC IDLE; and
- start or restart the data inactivity timer based on receiving the MAC SDU for the MTCH.

16. The wireless device of claim 15, wherein the MBS session is a Multicast session or a Broadcast session.

17. The wireless device of claim 15, wherein the MBS session, which cannot be received in RRC_IDLE, is a Multicast session.

18. The wireless device of claim 15, wherein the MBS session, which can be received in RRC_IDLE, is a Broadcast session.

19. The wireless device of claim 15, wherein the at least one processor is further configured to, skip to start or restart the data inactivity timer based on determining that the MBS session can be received in RRC_IDLE through the MTCH.

20. A base station in a wireless communication system comprising:
- a transceiver;
- a memory; and
- a processor operatively coupled to the transceiver and the memory, and configured to:
- control the transceiver to transmit, to a wireless device, a configuration of a data inactivity timer; and
- control the transceiver to transmit, to the wireless device, a Medium Access Control Service Data Unit (MAC SDU) for a Multicast/Broadcast Services (MBS) Traffic Channel (MTCH) while in Radio Resource Control (RRC),
- wherein the MTCH is a logical channel for an MBS session which cannot be transmitted in RRC IDLE, and
- wherein the data inactivity timer starts or restarts by the wireless device based on the MAC SDU.

* * * * *